United States Patent Office 3,035,392
Patented May 22, 1962

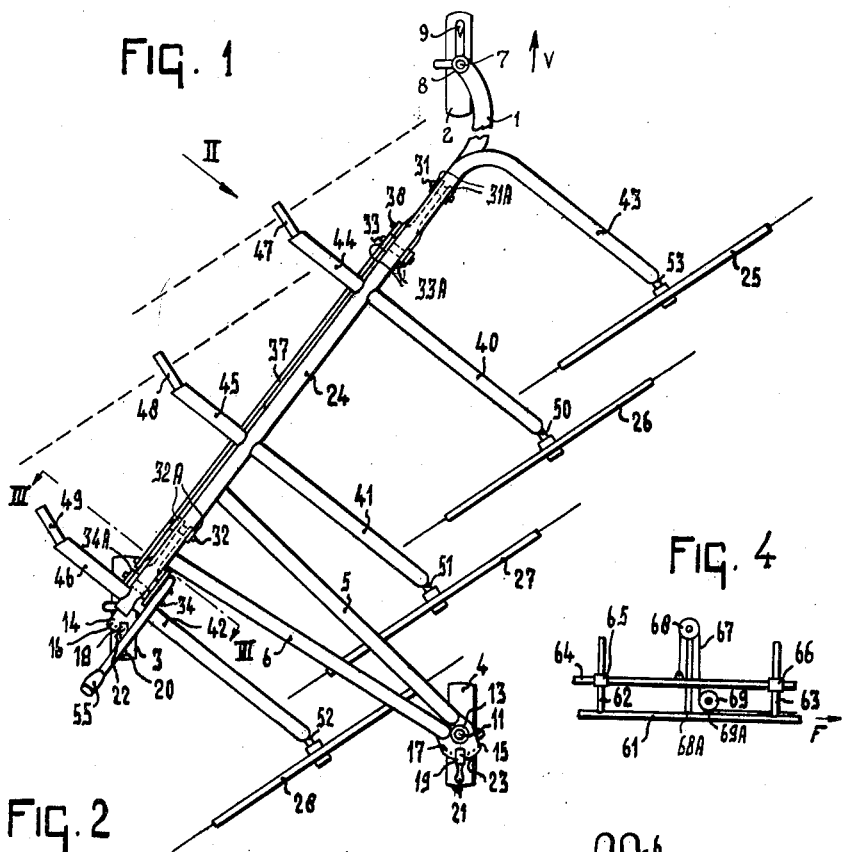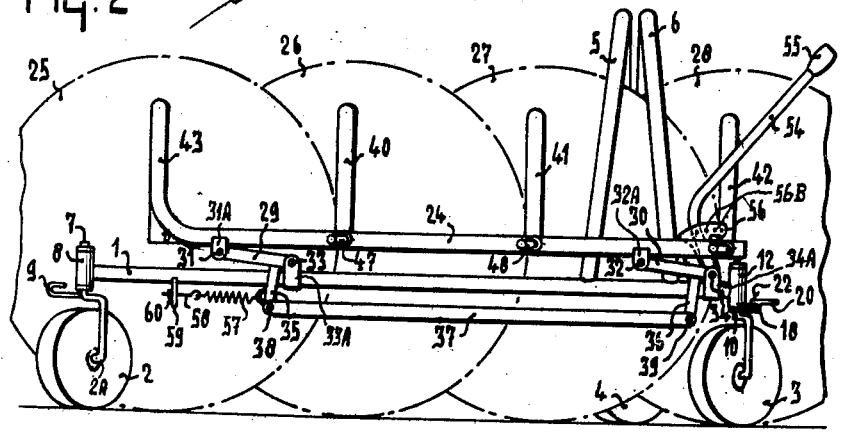

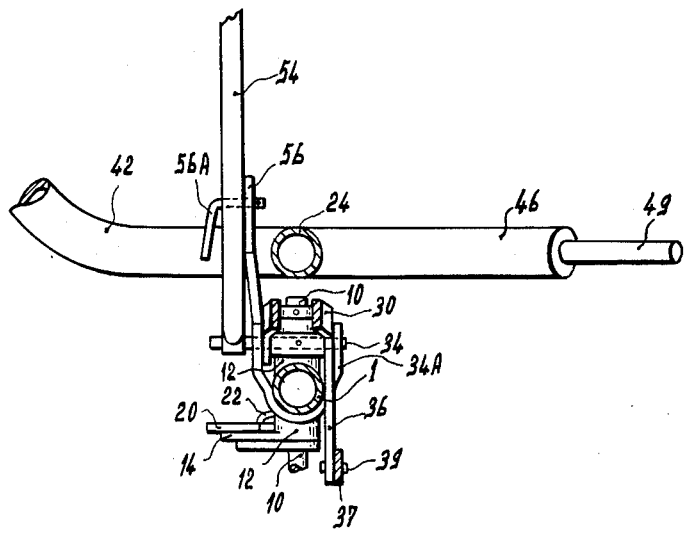

3,035,392
IMPLEMENT FOR LATERALLY DISPLACING
CROP LYING ON THE GROUND
Cornelis van der Lely, Zug, Switzerland, and Ary van der Lely, Maasland, Netherlands, assignors to C. van der Lely N.V., Weverskade, Maasland, Netherlands, a limited liability company of the Netherlands
Filed Apr. 19, 1960, Ser. No. 23,277
Claims priority, application Netherlands May 11, 1959
18 Claims. (Cl. 56—377)

This invention relates to an implement for laterally displacing crop lying on the ground, of the kind comprising a first frame and a plurality of rake wheels, which are arranged in such a manner that when the implement is in operation, the rake wheels rotate and laterally displace the crop.

The object of the invention is to provide an implement, the rake wheels of which are carried in a simple manner by the frame in such a way that they are vertically adjustable.

According to the present invention there is provided an implement of the kind set forth, wherein the rake wheels are mounted on a second frame formed by a supporting beam which is movable vertically or substantially vertically to different positions with respect to the frame, in such a way that in any position the supporting beam is parallel or substantially parallel to any other position which it may occupy, said supporting beam being fixable in at least one position.

For a better understanding of the invention and to show how the same may be carried into effect, reference will now be made by way of example to the accompanying drawings, in which:

FIGURE 1 is a plan view of an implement for the lateral displacement of crop lying on the ground, FIGURE 2 is a side view of the implement shown in FIGURE 1, as seen in the direction of the arrow II, FIGURE 3 is a section of part of the implement shown in FIGURE 1, as seen from the line III—III, and FIGURE 4 is a diagrammatic representation of a part of a second embodiment of the implement.

As shown in FIGURES 1, 2 and 3, the implement has a frame including a main frame beam or first frame 1 supported at one end by a ground wheel 2 and at the other end by a ground wheel 3. A third ground wheel 4 is connected to the main frame beam 1 with the aid of arc-shaped frame members 5 and 6. The rotational axle 2A of the ground wheel 2 is secured to a vertical shaft 7, which is freely rotatable in a bearing 8 fixed to the main frame beam 1. A towing-hook 9 is attached to the shaft 7, so as to turn therewith. The rotational axles of the ground wheels 3 and 4 are secured to vertical shafts 10 and 11 respectively, which are rotatable in bearings 12 and 13 respectively, and these ground wheels 3 and 4 can be fixed in different angular positions with respect to the main frame beam 1. For this purpose, the bearings 12 and 13 have secured thereto sector-shaped plates 14 and 15 respectively, which have series of holes 16 and 17 respectively. Arms 18 and 19 are secured to the shafts 10 and 11 and have handles 20 and 21 respectively fixed thereto, and they each have a hole to correspond with the series of holes 16 and 17 respectively. With the aid of locking pins 22 and 23, which can be inserted through the holes in the arms 18 and 19 and through the corresponding holes 16 and 17 in the sector-shaped plates 14 and 15, the ground wheels 3 and 4 can be prevented from turning about the axes of the vertical shafts 10 and 11.

Rake wheels 25, 26, 27 and 28 are carried by a supporting beam or second frame 24 which is located vertically above the main frame beam 1 and which is connected therewith by parallel links 29 and 30. The links 29 and 30 are arranged to turn about pivot pins 31 and 32 carried by lugs 31A and 32A respectively on the supporting beam 24, and about pivot pins 33 and 34 carried by brackets 33A and 34A respectively on the main frame beam 1. It will be noted from FIGURE 2 that the pivot pins 31 and 32 are nearer the towing-hook 9 than are the pivot pins 33 and 34 respectively. The pivot pins 31 and 32 lie in a substantially horizontal plane located at a higher level than a horizontal plane containing the pivot pins 33 and 34. The main frame beam 1 and the supporting beam 24 are substantially parallel, as are the two links 29 and 30. Hence the main beam, supporting beam and links together form a parallelogram link structure. To the links 29 and 30 are secured arms 35 and 36 respectively, whose free ends are coupled to each other by a coupling rod 37 which is connected with the aid of pivot pins 38 and 39 to such free ends. The rake wheels 26, 27 and 28 are arranged on arc-shaped supporting members or laterally extending beams 40, 41 and 42, fixed to the supporting beam or second frame 24. The end 43 of the supporting beam 24, on which the rake wheel 25 is arranged, is shaped in the same form as the arc-shaped supporting members 40, 41 and 42. The supporting members 40, 41 and 42 and the curved end 43 of the supporting beam 24 are located in parallel substantially vertical planes, and it will be apparent from FIGURE 2 that the supporting members and the curved end of the supporting beam are bent upwardly. The frame members 5 and 6 are also arc-shaped and extend over the row of rake wheels.

On the side of the supporting beam 24 remote from the supporting members 40, 41 and 42, there are shorter, horizontal supporting members or laterally extending beams 44, 45 and 46 which are aligned with the supporting members 40, 41 and 42 respectively when seen in plan view. Stub-axles 47, 48 and 49 are fixed to the ends of the supporting members 44, 45 and 46 respectively, and rake wheels may be arranged on these stub-axles if desired. The stub-axles 47, 48 and 49, and further stub-axles 50, 51 and 52 which are fixed to the supporting members 40 to 42, are inclined to the vertical planes in which the respective supporting members are located. Also, a stub-axle 53 which is fixed to the end 43, is inclined to the vertical plane in which the end 43 is located.

A lever 54, provided with a handle 55, is fixedly connected to the link 30 at the location of the pivot pin 34. On turning the lever 54 about the axis of the pivot pin 34, the links 29 and 30 will turn about the pivot pins 33 and 34, and the supporting beam 24 with the rake wheels secured thereto will be displaced vertically. Since the main beam 1, supporting beam 24 and links 29 and 30 together form a parallelogram, the supporting beam 24 will always remain parallel to itself when it is displaced vertically. For transport purposes, it may be desirable to fix the supporting beam with the rake wheels in a raised position relative to the frame. The supporting beam is fixed in position with the aid of a plate 56 which is rigidly secured to the main frame beam 1, and a pin 56A (FIG. 3) which may be passed through one of a number of holes 56B in the plate 56 and through a hole in the lever 54. In this manner the lever 54, and hence the rake wheels, are fixed in relation to the main frame beam 1. When the implement is in use, the lever 54 may be free to move in relation to the frame, so that the supporting beam 24 with the rake wheels secured thereto is capable of moving up and down in order to accommodate unevennesses in the ground. If desired, the lever 54 may be fixed in relation to the plate 56 by the pin 56A when the implement is in operation, so that the supporting beam 24 with the rake wheels arranged thereon occupies, in this case, a fixed position relative to the frame. In FIGURE 1, the pin 56A has been removed from the holes in the lever 54 and in the plate 56. Therefore the supporting beam 24, with the rake wheels, would be free to move in a vertical sense. In FIGURE 3, on the other hand, the lever 54 is fixed in relation to the main frame beam 1 with the aid of the pin 56A. One end of a spring 57 is connected to the arm 35, secured to the link 29. The other end of the spring 57 is connected to the main frame beam 1 with the aid of a screw-threaded rod 58, which is passed through a hole in a support 59, secured to the main frame beam 1. A nut 60 is provided on the rod 58 on the side of the support 59 remote from the spring 57, and by turning the nut 60 the tension in the spring 57 can be adjusted. When the spring 60 is in tension and the lever 54 is not fixed in relation to the frame, the spring tends to lift the supporting beam 24, with the rake wheels arranged thereon, from the ground. Thus at least part of the weight of the supporting beam and the rake wheels is carried by the frame. Lifting of the rake wheels with the aid of the lever 54 will be facilitated. The pressure of the rake wheels on the ground can be adjusted by adjusting the tension in the spring 57, provided that the supporting beam 24 and the associated rake wheels are freely movable in relation to the frame.

During operation, the implement is propelled in the direction of the arrow V in FIGURE 1. In the position shown in FIGURE 1, in which the rake wheels 25, 26, 27 and 28 are arranged on the arcuate supporting members 40, 41, 42 and 43 which are located to the rear of the supporting beam 24, the implement would operate as a side-delivery rake, one rake wheel laterally displacing crop to the next succeeding rake wheel, so that together the rake wheels displace to the left the crop lying on a strip of ground. One or more rake wheels may alternatively be arranged on the stub-axles 47, 48 and 49 fixed to the supporting members 44, 45 and 46 which are located forwardly of the supporting beam 24. Thus two groups of rake wheels are supported by the frame, the rake wheels of one group displacing crop independently of the rake wheels of the other group, and the implement operates as a swath-turner. The groups may be arranged on the frame at various locations. For example, the rake wheels 27 and 28 may be removed from the supporting members 41 and 42 and rearranged on the supporting members 44 and 45, as is shown diagrammatically by broken lines in FIGURE 1. Alternatively, the rake wheels 25 and 26 may be removed and rearranged, for example, on the supporting members 45 and 46. It is also possible to remove only the rake wheel 28 for example, and to place it in position on one of the supporting members 44, 45 and 46 and to arrange two additional rake wheels on the other two of the supporting members 44, 45 and 46. Thus two groups of three rake wheels are formed.

FIGURE 4 shows diagrammatically a second embodiment of the connection between the supporting beam and the main frame beam. To a main frame beam 61 are fixed two vertical posts 62 and 63, and bearings 65 and 66 are secured to a supporting beam 64, on which rake wheels are mounted. The bearings 65 and 66 are free to move along the posts 62 and 63 respectively. Thus the supporting beam 64 may move vertically up or down with respect to the main frame beam 61. To move the supporting beam 64, a rope 67 is passed round pulleys 68 and 69 which are fixed to the main frame beam 61 with the aid of brackets 68A and 69A. On pulling the rope 67 in the direction of the arrow F, the supporting beam 64 will be displaced upwardly. If the rope 67 is then fixed, the supporting beam 64 cannot move downwardly from its position, but it is still capable of moving further upwardly, and of moving up and down above that position.

What we claim is:

1. An implement for laterally displacing crop lying on the ground comprising a first mobile, stable, vehicular frame, a second frame, means for vertically adjustably mounting said second frame on said first frame, a plurality of laterally extending beams mounted on said second frame having rake wheels, respectively, on terminal portions thereof, said wheels being in echelon relationship.

2. The structure of claim 1 wherein said means comprises parallel links connecting said first frame and second frame.

3. The structure of claim 1 wherein said means for vertically adjustably mounting said second frame on said first frame includes at least two substantially vertical posts and means for mounting said second frame in slidable relationship with said posts wherein said posts act as guide means for said second frame.

4. The structure of claim 2 wherein said first frame is mounted on a plurality of ground-engaging supporting wheels.

5. The structure of claim 3 wherein said first frame is mounted on a plurality of ground-engaging supporting wheels.

6. The structure of claim 2 wherein said means for adjustably mounting said second frame on said first frame includes means for locking said second frame in various adjusted positions in vertical relation to said first frame.

7. The structure of claim 3 wherein said means for adjustably mounting said second frame on said first frame includes means for locking said second frame in various adjusted positions in vertical relation to said first frame.

8. The structure of claim 1 wherein said first frame is provided with a plurality of spaced supporting wheels, one of said supporting wheels having a shaft and a towing hook attached to said shaft.

9. The structure of claim 6 wherein said locking means includes at least one plate having a series of holes, a locking pin adapted to be inserted in one of said holes, and means for supporting said pin, said plate and last named means comprising a pair of members, one of said members being mounted in fixed relation with said first frame and the second of said members being mounted in fixed relation with said second frame.

10. The structure of claim 7 wherein said locking means includes at least one plate having a series of holes, a locking pin adapted to be inserted in one of said holes, and means for supporting said pin, said plate and last named means comprising a pair of members, one of said members being mounted in fixed relation with said first frame and the second of said members being mounted in fixed relation with said second frame.

11. The structure of claim 1 wherein said means includes a pair of spaced links, each link having one of its ends pivotally attached to said first frame and the other of its ends pivotally attached to said second frame whereby said first and second frame and said links form a parallelogram.

12. The structure of claim 11 wherein said main frame is supported by a plurality of ground-engaging wheels and means for permitting said wheels to rotate about a vertical axis and means for locking at least some of said wheels in fixed relationship on said vertical axis.

13. The structure of claim 1 wherein said laterally extending beams are provided with stub axles, said stub axles being inclined to the vertical planes in which the respective supporting pins are rotated.

14. The structure of claim 1 wherein said laterally extending beams extend on opposite sides of a vertical plane passing through the center of said second frame.

15. The structure of claim 13 wherein the stub axles extend at an acute angle to a vertical plane passing through its laterally extending beam.

16. The structure of claim 1 wherein said laterally extending beams are arc-shaped in cross section.

17. The structure of claim 1 wherein means is provided with manual means for raising or lowering said second frame and the rake wheels supported thereon, said manual means including a link and means connecting said link to said manual means and said second frame.

18. The structure of claim 17 including means for locking said second frame and the rake wheels mounted thereon in adjusted vertical relationship to said first frame.

References Cited in the file of this patent
UNITED STATES PATENTS

| | | |
|---|---|---|
| 2,447,354 | Morrill | Aug. 17, 1948 |
| 2,712,723 | Ryan | July 12, 1955 |
| 2,925,702 | Plant | Feb. 23, 1960 |